United States Patent [19]
Yokoyama et al.

[11] Patent Number: 5,872,871
[45] Date of Patent: Feb. 16, 1999

[54] METHOD AND DEVICE FOR MEASURING THE POSITION OF A PATTERN

[75] Inventors: Yoshio Yokoyama, Anjo; Takahiro Itakura, Kariya, both of Japan

[73] Assignee: Nippondenso Co., Ltd., Japan

[21] Appl. No.: 635,175

[22] Filed: Apr. 25, 1996

[30] Foreign Application Priority Data

Apr. 25, 1995 [JP] Japan ................................. 7-101411

[51] Int. Cl.$^6$ ................................................. G06K 9/36
[52] U.S. Cl. .................. 382/292; 382/173; 382/199; 382/217; 382/294
[58] Field of Search .................. 382/151, 294, 382/171, 141, 173, 174, 199, 205, 206, 209, 217, 219, 221, 291, 292, 303; 348/94, 95, 130, 87; 345/113; 395/506, 135; 250/559.04, 559.3, 559.34, 559.29

[56] References Cited

U.S. PATENT DOCUMENTS

| | | | |
|---|---|---|---|
| 4,091,394 | 5/1978 | Kashioka et al. ................... | 382/151 |
| 5,046,190 | 9/1991 | Daniel et al. ........................ | 382/303 |
| 5,048,103 | 9/1991 | Leclerc et al. ...................... | 382/294 |
| 5,220,621 | 6/1993 | Saitoh ................................. | 382/200 |
| 5,226,095 | 7/1993 | Okumura et al. ................... | 382/151 |
| 5,440,650 | 8/1995 | Hieda et al. ........................ | 382/112 |
| 5,548,326 | 8/1996 | Michael .............................. | 348/87 |
| 5,592,573 | 1/1997 | Eisenbarth et al. ................. | 382/294 |

FOREIGN PATENT DOCUMENTS

| | | |
|---|---|---|
| 3-10107 | 1/1991 | Japan . |
| 3-167407 | 7/1991 | Japan . |
| 3-231384 | 10/1991 | Japan . |
| 4-109104 | 4/1992 | Japan . |
| 4-235321 | 8/1992 | Japan . |
| 4-254746 | 9/1992 | Japan . |
| 6-120310 | 4/1994 | Japan . |

*Primary Examiner*—Leo H. Boudreau
*Assistant Examiner*—Brian P. Werner
*Attorney, Agent, or Firm*—Pillsbury Madison & Sutro, LLP

[57] ABSTRACT

Pixels A, B, C, D and E of a reference image X, which are suitable for use in a pattern matching operation, are automatically determined on a pattern of the reference image. The automatic determination of the pixels is done based on a change of brightness at areas around the selected pixels. Coordinates of all of the selected pixels, such as $(x_1, y_1)$, $(x_2, y_2)$, $(x_3, y_3)$, $(x_4, y_4)$ and $(x_5, y_5)$ are stored in memory. A scan of the image to be detected is done at a fixed offset area for each of the selected pixels. The values of the difference in brightness between the selected pixels and the scanned points are accumulated. The minimum value of the accumulated difference is detected, and the coordinate of the scanned point which provides the minimum accumulated difference is determined as a deviation of the detected image from the reference image.

4 Claims, 14 Drawing Sheets

Fig.1-(a)
(PRIOR ART)
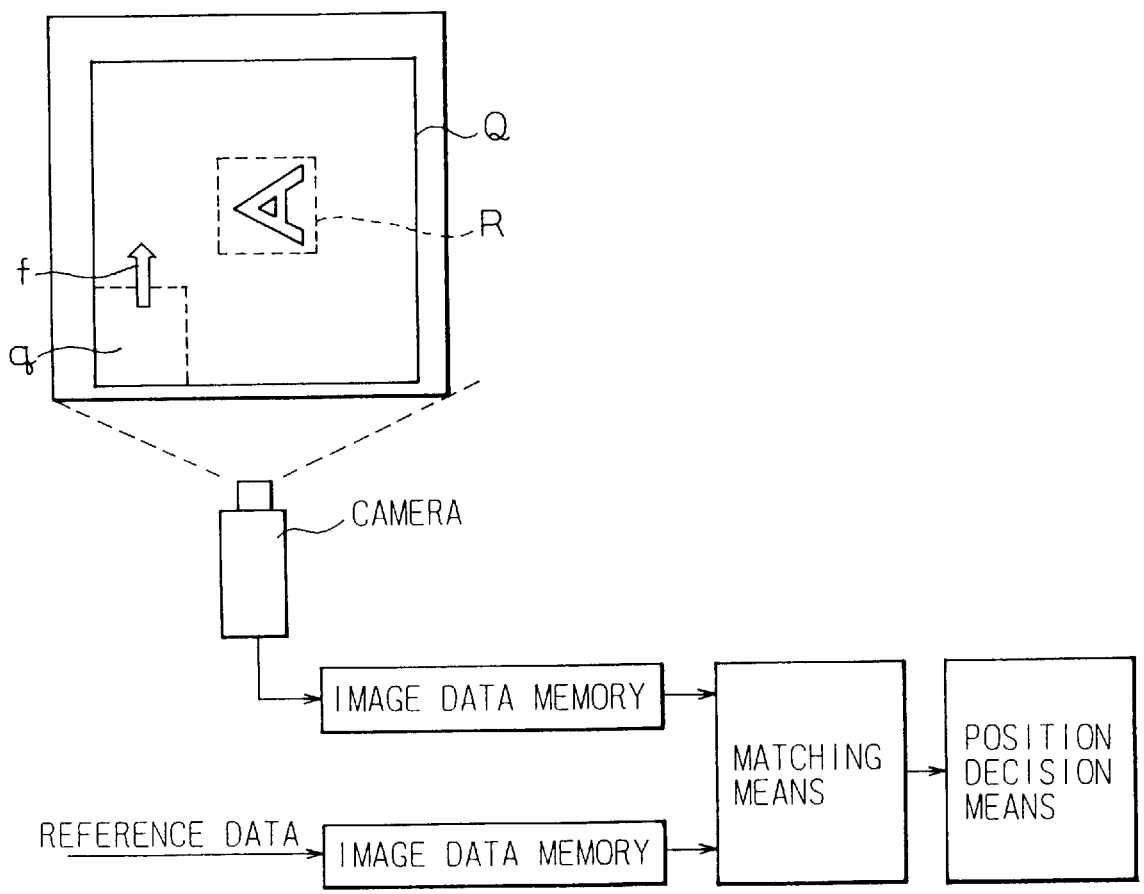
Fig.1-(b)
(PRIOR ART)
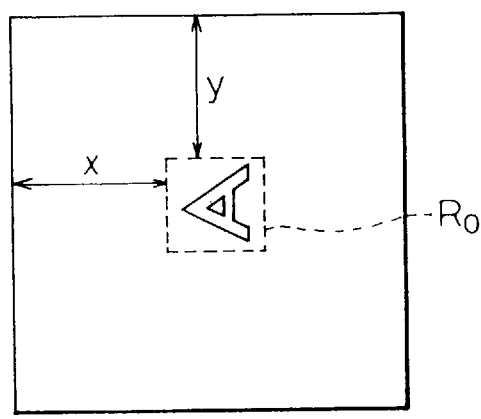

Fig.2-(a)
(PRIOR ART)
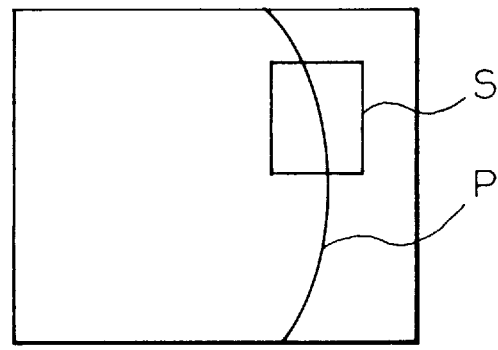
Fig.2-(b)
(PRIOR ART)
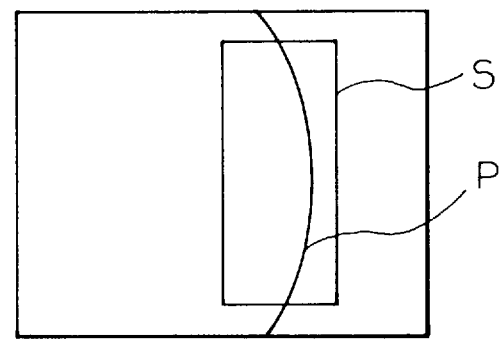
Fig.3
(PRIOR ART)
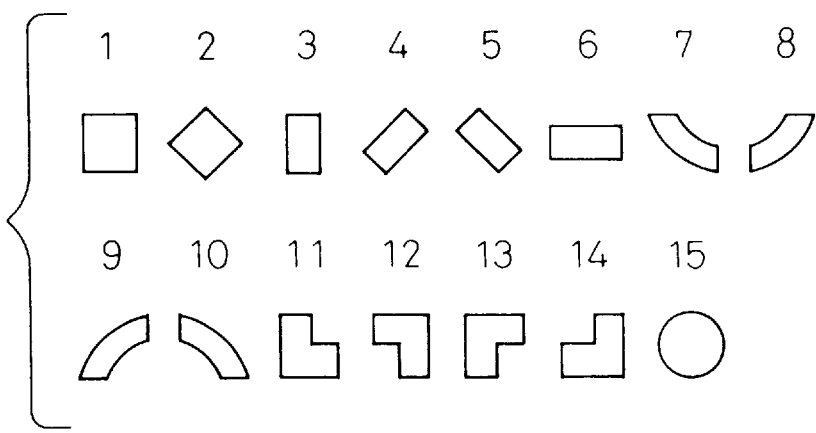

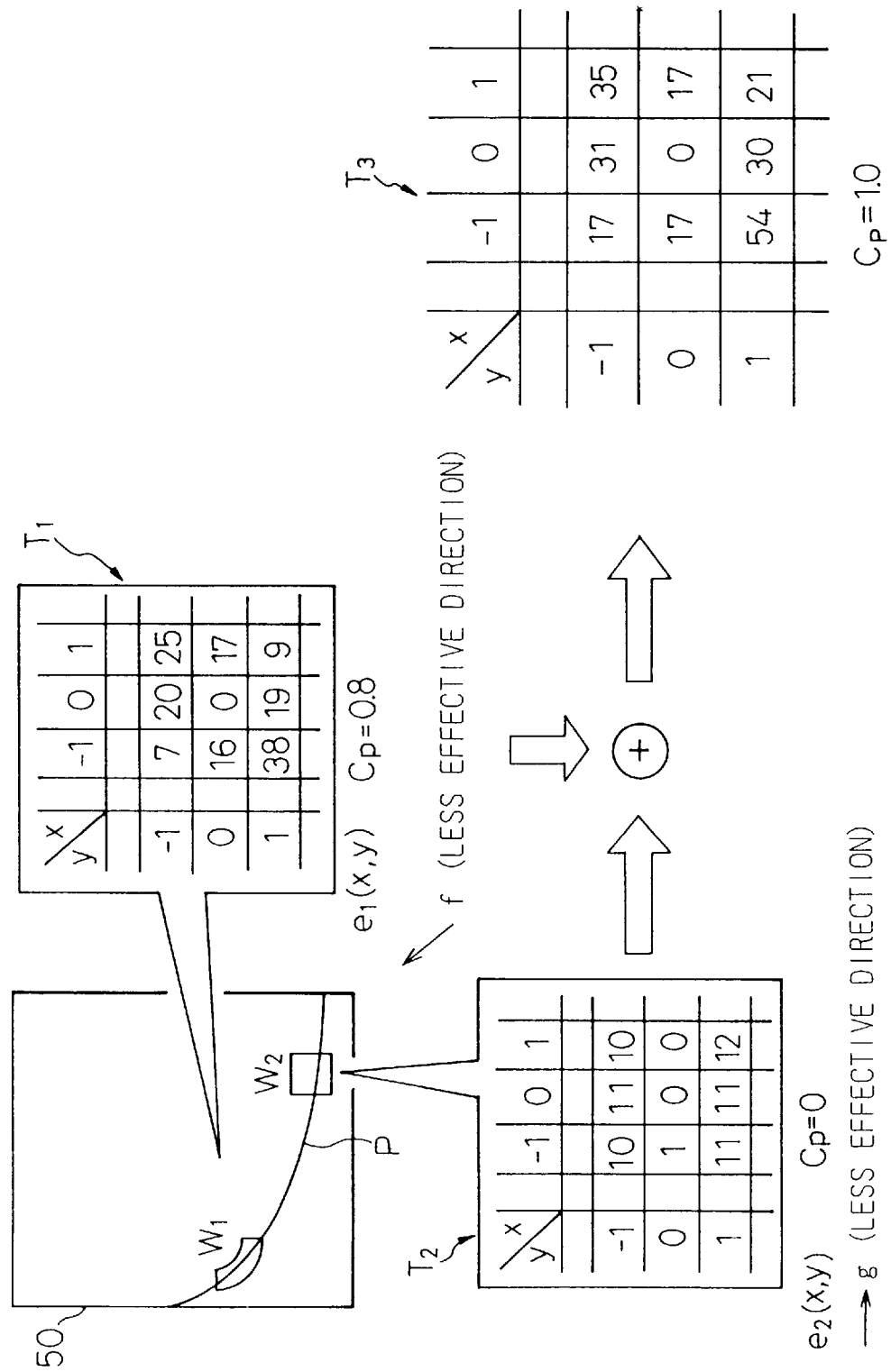

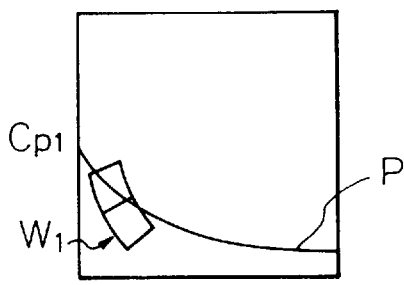
Fig.5-(a)
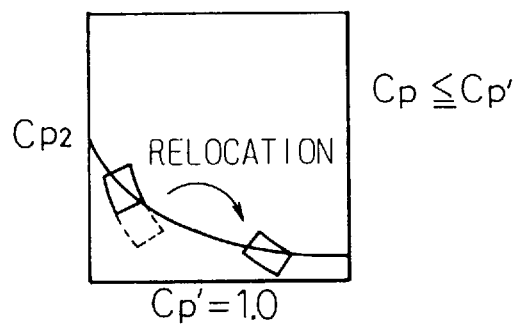
Fig.5-(b)
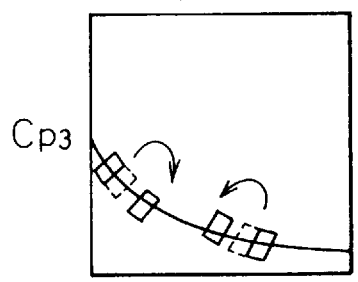
Fig.5-(c)
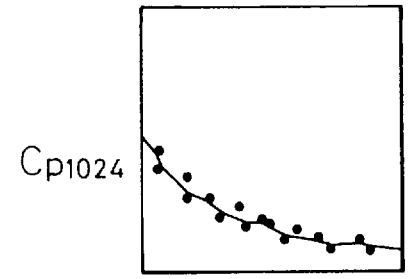
Fig.5-(d)
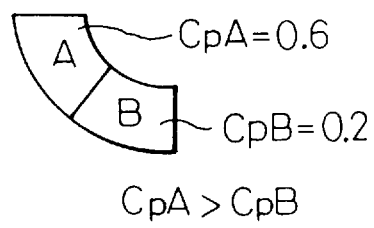
Fig.6

Fig.7-(a)
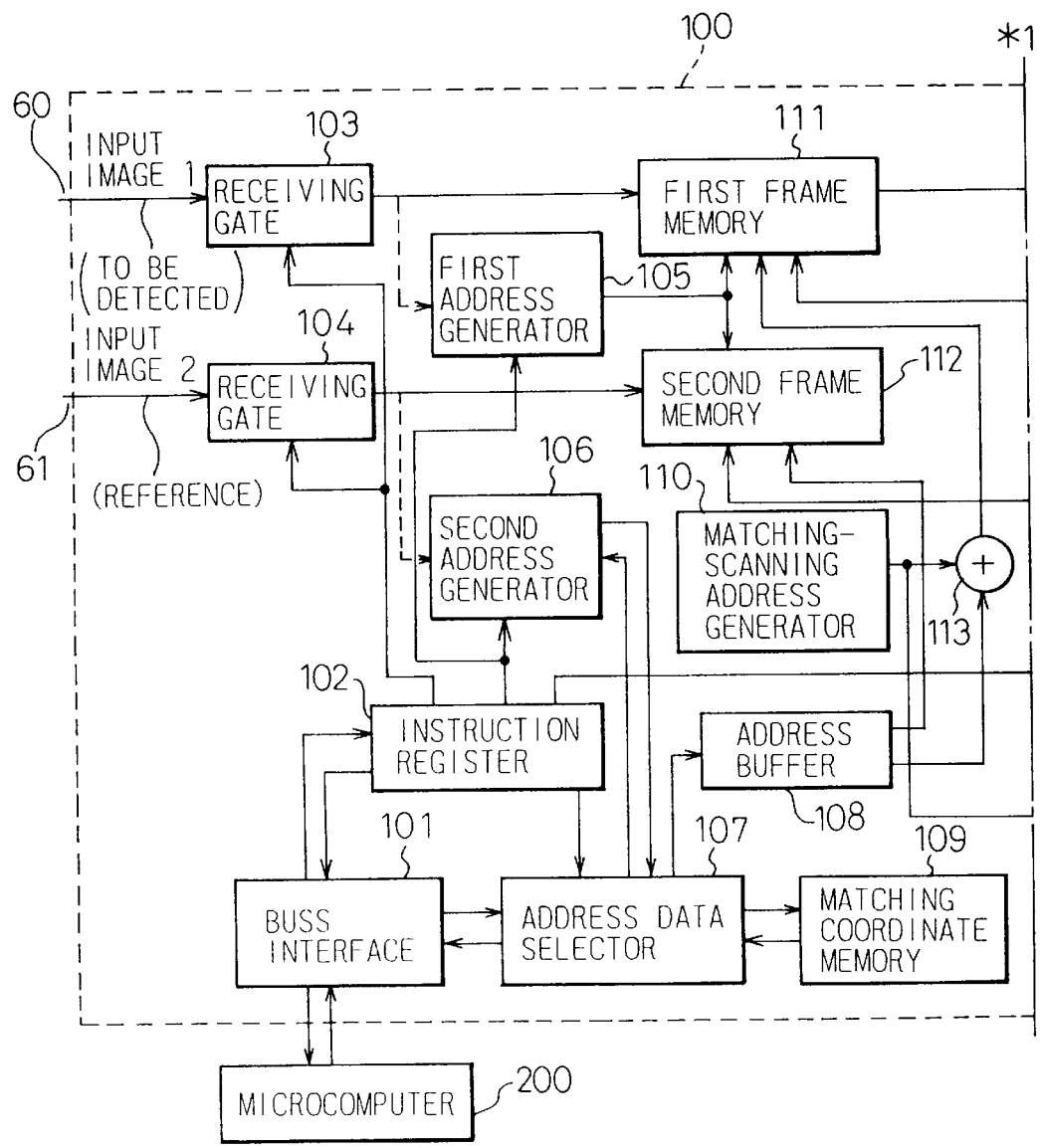

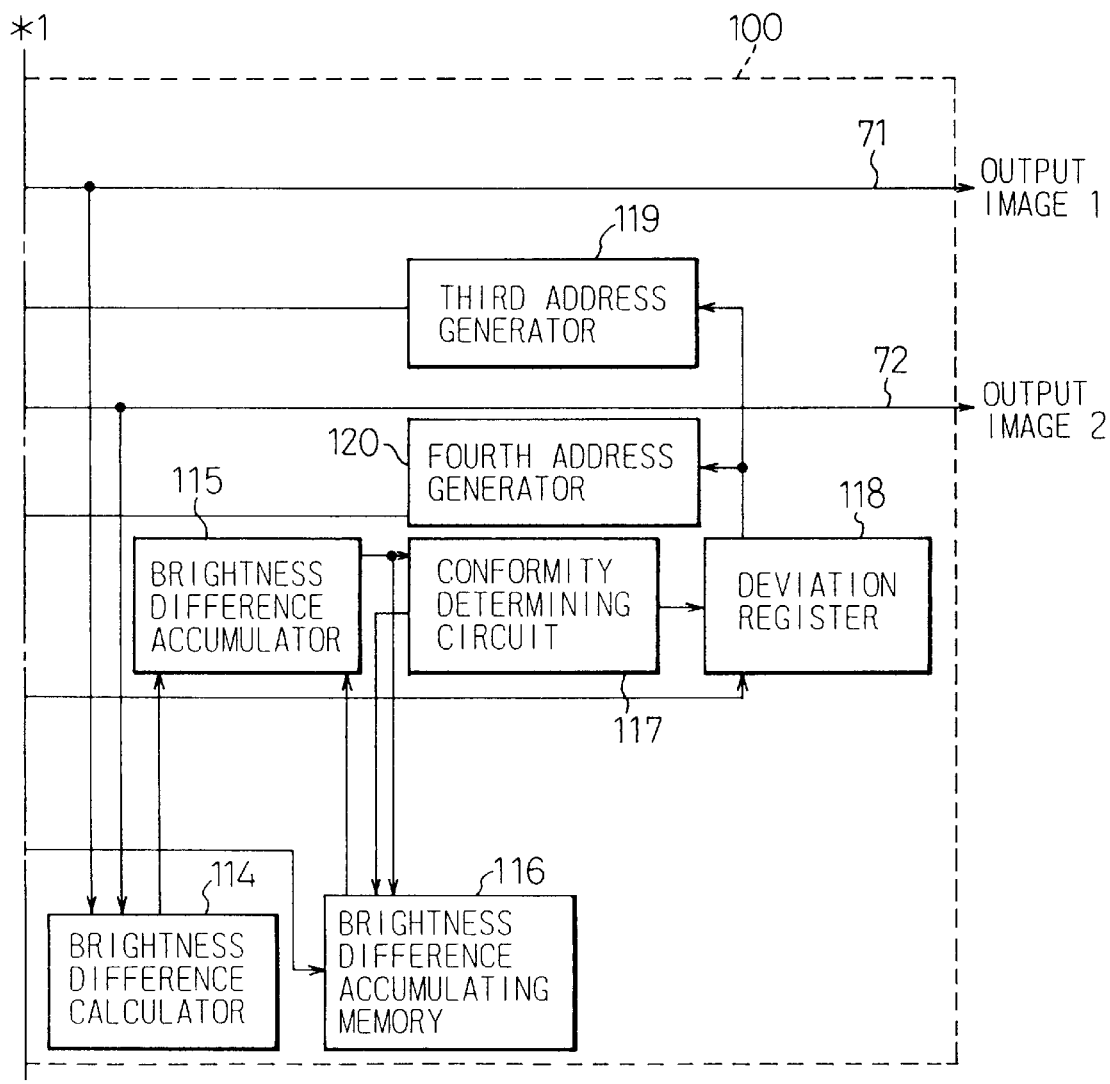

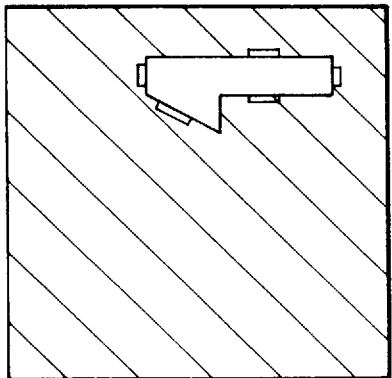
Fig.8-(e)
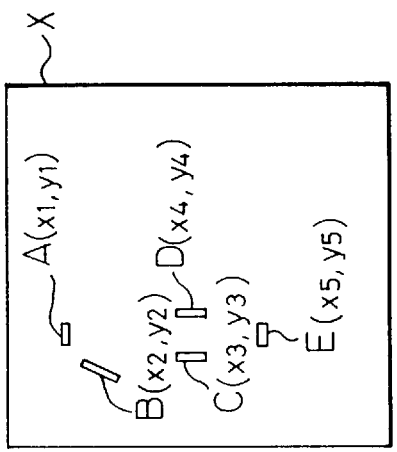
Fig.8-(b)
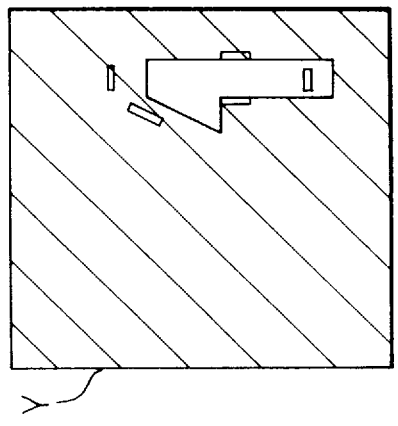
Fig.8-(d)
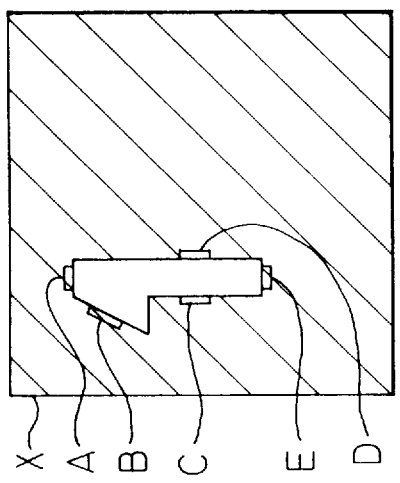
Fig.8-(a)
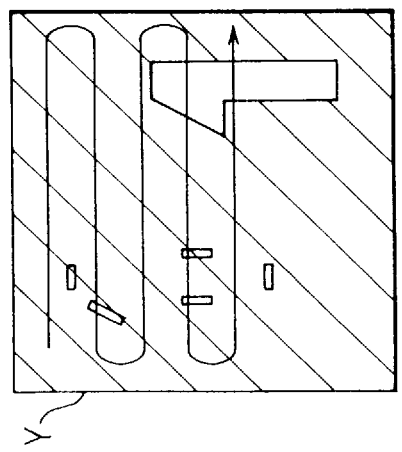
Fig.8-(c)

| DIRECTION \ ORDER | 1 | 2 | 3 |
|---|---|---|---|
| ↖ | $A_1$ | $A_2$ | $A_3$ |
| ↑ | $B_1$ | $B_2$ | $B_3$ |
| ↗ | $C_1$ | $C_2$ | $C_3$ |
| → | $D_1$ | $D_2$ | $D_3$ |
| ↘ | $E_1$ | $E_2$ | $E_3$ |
| ↓ | $F_1$ | $F_2$ | $F_3$ |
| ↙ | $G_1$ | $G_2$ | $G_3$ |
| ← | $H_1$ | $H_2$ | $H_3$ |

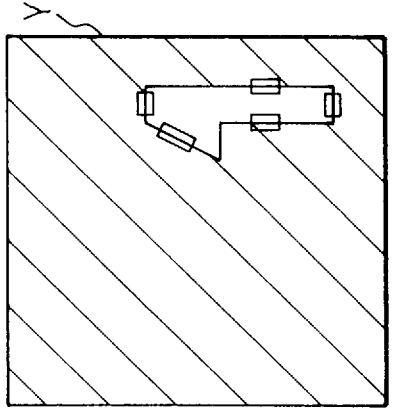
Fig.14-(e)
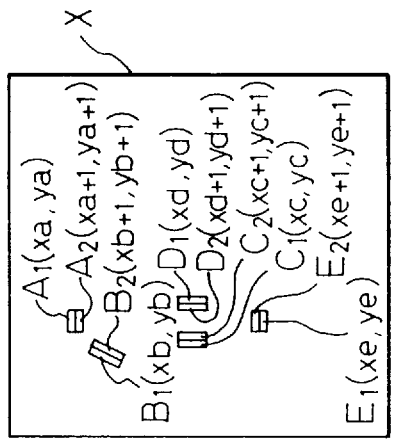
Fig.14-(b)
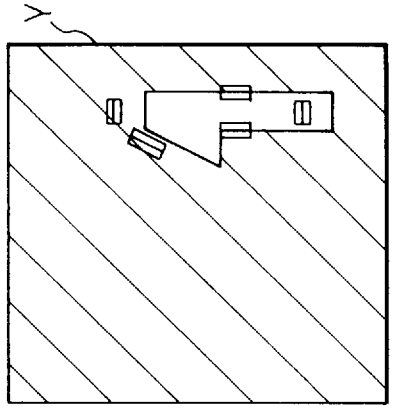
Fig.14-(d)
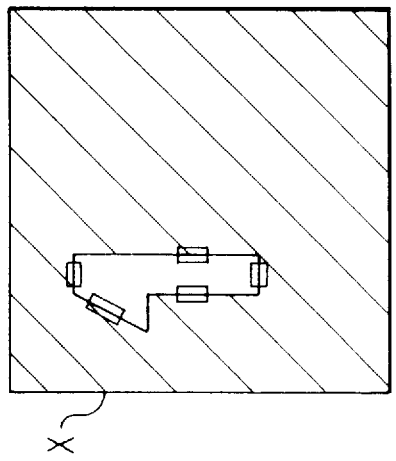
Fig.14-(a)
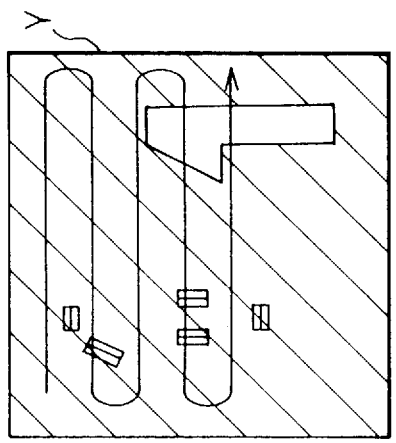
Fig.14-(c)

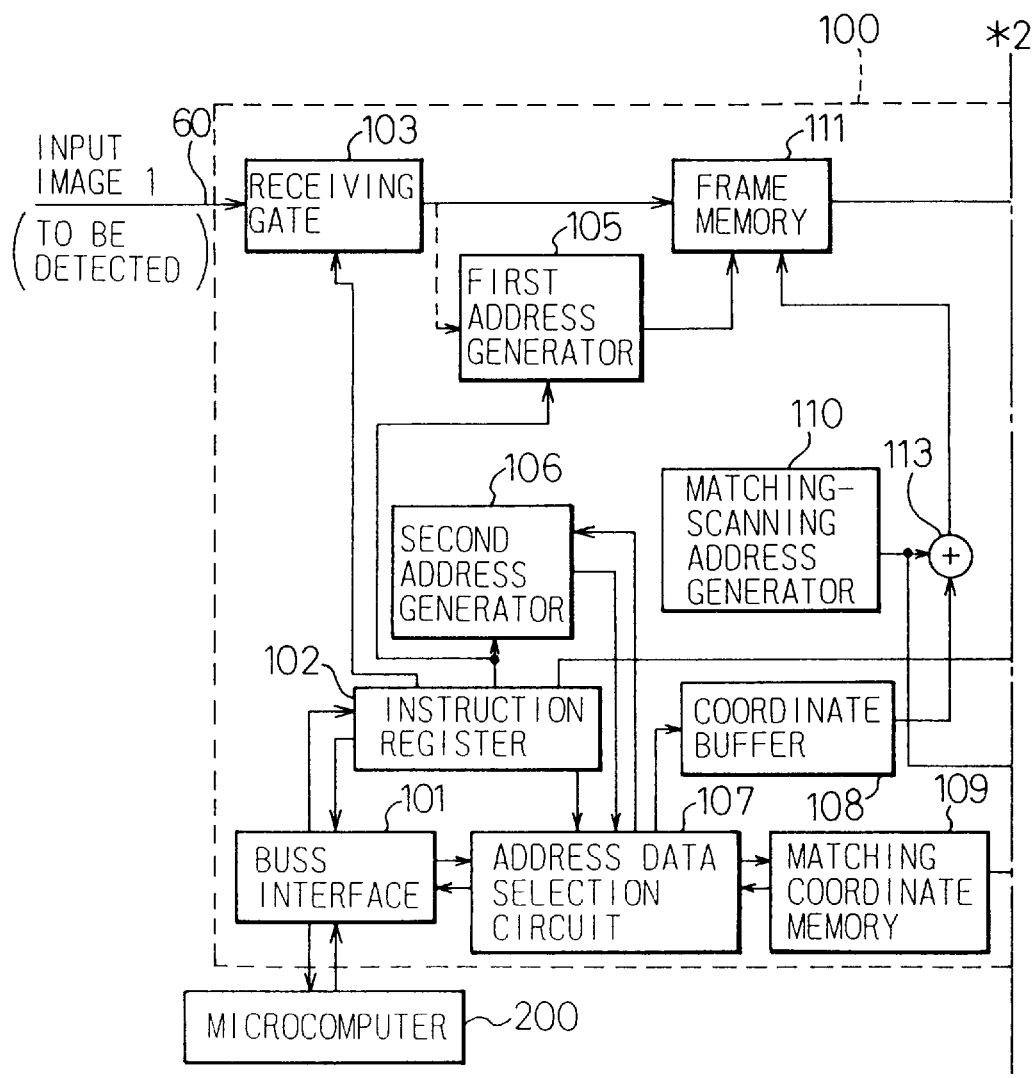
Fig.15-(a)

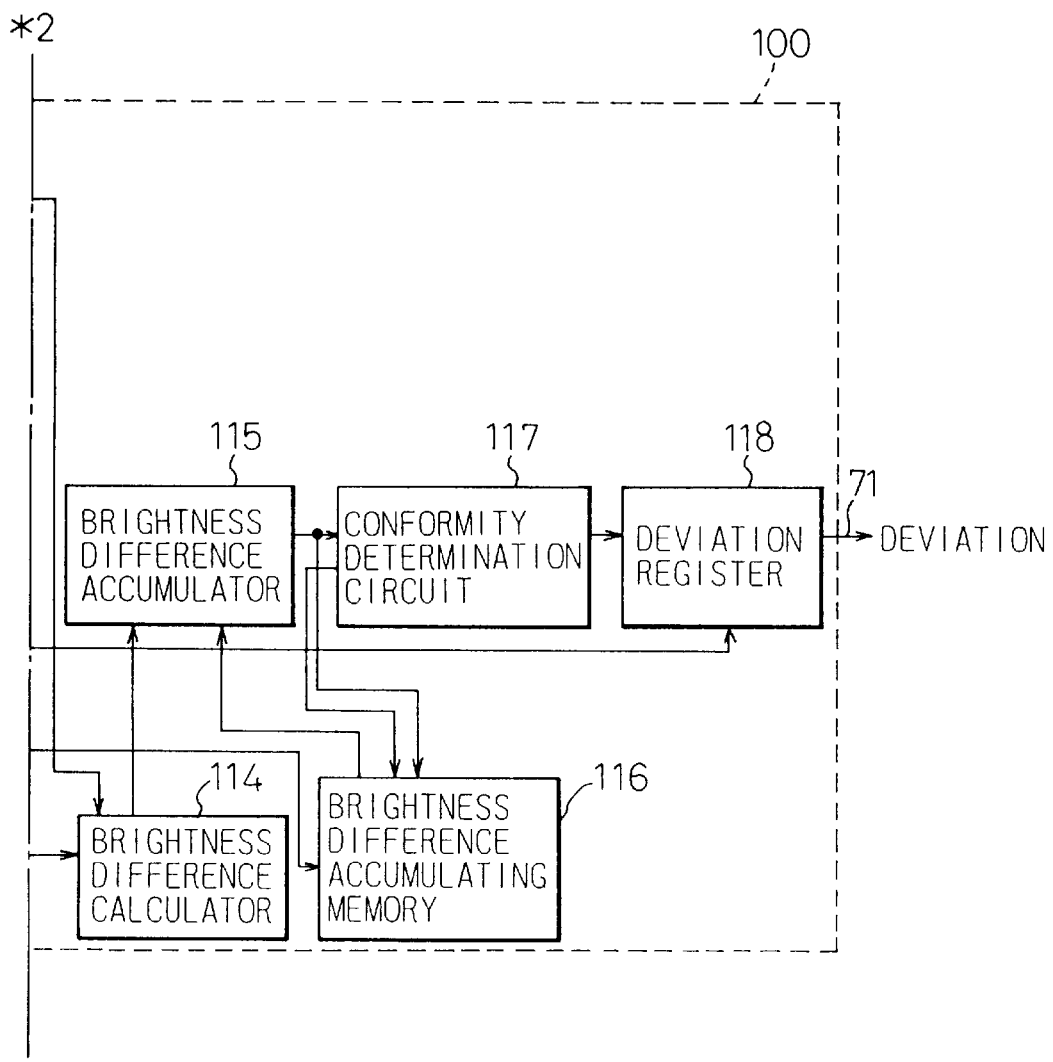

METHOD AND DEVICE FOR MEASURING THE POSITION OF A PATTERN

BACKGROUND OF THE INVENTION

1. Field of the Invention

The present invention relates to a method and apparatus for measuring, by using an image processing technology, a pattern of an article to be tested, such as a dial plate (figured plate) for a measuring instrument or a mask with a pattern for a wafer for producing a semiconductor.

2. Description of Related Art

A known prior art device measures a deviation of a pattern, wherein an image to be detected is, under a pixel to pixel basis, compared with a reference image, thereby detecting a deviation of the detected image from the reference image. In order to increase a calculation speed, the Japanese Unexamined Patent Publication 3-167407 has proposed the use of a part or section of the reference image, which is then compared with the detected image. However, such a use of partial image is defective due to its low precision of measurement.

SUMMARY OF THE INVENTION

An object of the present invention is to provide a technique capable of overcoming the above mentioned difficulty in the prior art.

Another object of the present invention is to provide a technique capable of increasing the calculation speed while maintaining a desired precision.

According to the present invention, a part of the reference image including pixels which are used for a determination of whether an image to be detected is matched. The pixels are, in an automatic fashion, selected based on a degree of change in brightness at areas around the selected pixels and registered together with their coordinates. At a coordinate of each of the selected pixels, scanning is done in a fixed range of offset so that a difference is detected between a memorized brightness of the selected pixel and a detected brightness at the scanned point. The difference is accumulated for all the selected pixels of the partial reference image at each of the scanned points. The minimum value of the accumulated difference is detected, and the coordinate of the scanned point, which provides this minimum accumulated difference, is determined as the offset (deviation) of the detected image from the reference image.

According to the present invention, the selection of the pixels of the reference image can be automatically determined based on a degree of a change in the brightness at areas around the selected pixel. Thus, the selection of the partial image can be effectively done while maintaining a desired precision.

BRIEF DESCRIPTION OF THE DRAWINGS

FIG. 1-(*a*) illustrates a conventional system for the determination of a deviation between a reference image and a detected image.

FIG. 1-(*b*) illustrates how coordinates of a reference image are determined.

FIG. 2-(*a*) illustrates an example of a shape of a partial image to be used for a pattern matching operation in relation to a pattern in a reference image.

FIG. 2-(*b*) is similar to FIG. 2-(*a*) but illustrates a different shape of a partial image.

FIG. 3 shows various shapes of patterns used for a partial image.

FIG. 4 illustrates an addition of an additional reference image for improving precision.

FIGS. 5-(*a*) to (*d*) illustrates a process for division and relocation of a pixel in a partial image.

FIG. 6 illustrates the details of a shape of a partial image in FIG. 5-(*a*).

FIGS. 7-(*a*) and (*b*) show a block diagram of an error detection device in the first embodiment of the present invention.

FIGS. 8-(*a*) to (*e*) illustrate a method for determination of matching according to the present invention.

FIGS. 14-(*a*) to (*e*) illustrates a modification of the present invention.

FIGS. 15-(*a*) and (*b*) illustrate an error detection device in another embodiment of the present invention.

DESCRIPTION OF PREFERRED EMBODIMENT

Figure 9:
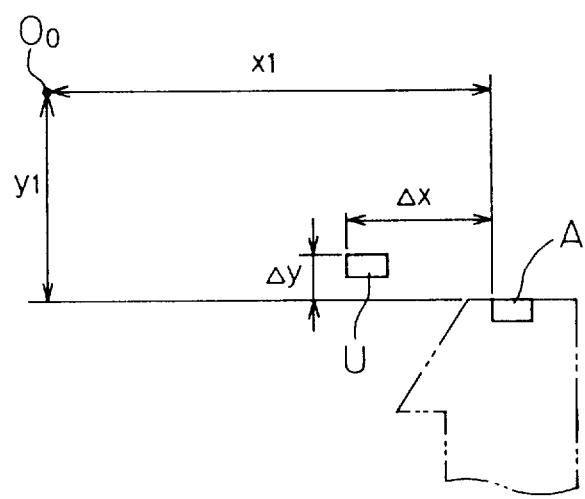
FIG. 9 illustrates a scanning operation according to the present invention.

The problem to be solved by the present invention in the prior art will be explained first. In order to inspect a pattern of a tested article, such as a dial plate for a measuring instrument or a mask for a wafer for producing a semiconductor, using an image processing technology, Japanese Unexamined Patent Publication 3-167407 proposed the detection of a deviation of an actual image of the article from a reference image. Namely, in FIG. 1-(*a*) showing this invention, a region is expressed by Q, where a search for a pattern of a product is executed. In FIG. 1-(*a*), such a pattern of the product is expressed by a simple character "A" for the sake of explanation. In order to allow the detection of the pattern on the region Q of the product, information related to the reference pattern $R_0$ corresponding to the pattern R to be detected is pre registered in a memory. The information includes a brightness of the image of the pattern and a position of the pattern of the reference image R0 expressed by a coordinate system (x, y) as shown in FIG. 1-(*b*). The search region Q is determined so as to allow the pattern to be detected when a deviation of the latter from the reference pattern R0 is within a permissible range.

In FIG. 1-(*a*), a detection region is expressed by "q", which is subjected to scanning as shown by arrow f in the search region Q, while a determination of conformity based on a brightness difference is done between the reference pattern R0 and a detected pattern at the detected region q. The position of the pattern R is then decided as the location where the highest degree of conformity is obtained. In order to calculate the degree of conformity, a sum of values of differences in brightness between the image of the reference pattern R0 and the image of the detected region q is obtained on a pixel to pixel basis. Namely, the area of the reference pattern R0 in term of the number of pixels is expressed by m (number of pixels along the x axis)×n (number of pixel along the y axis), while the search area Q in term of the number of pixels is expressed by M (number of pixels along the x axis)×N (number of pixels along the y axis). As a result, the total number of additions or subtractions needed to obtain the total difference is equal to m×n×N×M.

In order to obtain a high speed measurement of the summed deviation between the pattern R to be detected and the reference pattern R0, a reduction in the values of the number m, n, M and N is necessary. The reduction of the value of the number M or N is not easy due to the fact that the value of the number M or N is dependent on the area of the region in which the detected pattern can be displaced. Namely, such a reduction of the value of the number M or N would cause the detection of the pattern to become impossible. Conversely, a reduction of the value of the number n or m causes the precision of the measurement of the deviation to be reduced. Thus, it is important that a part of the reference image is effectively used for obtaining an increased calculation speed while maintaining a desired precision of the measurement.

FIG. 2-(a) or 2-(b) illustrates how the registration (memorization) of a portion of the image of the reference pattern is done. Namely, in FIG. 2-(a) or 2-(b), a rectangular section S illustrates a partial image as registered, while P schematically shows a pattern in the reference image. Between the partial reference image and the detected pattern, a pixel to pixel comparison of conformity is done by using a brightness, and a summation of the pixel to pixel deviation as a difference between the values of brightness is calculated in order to evaluate the similarity between the reference pattern and the detected pattern. In particular, the part of a reference image (below, partial image S) includes pixel to pixel data of brightness, which are compared on a coordinate to coordinate basis with the detected values of the brightness of the detected image. FIGS. 2-(a) and (b) illustrate different ways of registering the reference pattern S. The example in FIG. 2-(b) is much more desirable than that in FIG. 2-(a). Namely, in the example in FIG. 2-(b), the partial reference image can cover a greater length of the pattern thus, resulting in an increase in a noise to signal ratio, and thereby increasing the precision. However, the number of pixels of the partial reference image S shown in FIG. 2-(b) is increased over that in FIG. 2-(a). Thus, FIG. 2-(b) requires an increased calculation time.

The inventors have found that a deviation of the detected image from the reference image originates, for example, at a printing system from various factors such as a thickening, thinning, undulation, distortion, etc., and at an imaging system from a quantitized error, random noise. In order to allow the variation to be quantitatively determined in a viewing system, the variation is separated into the $\sigma_f$ caused by factors based on the shape of the pattern and the $\sigma_b$ caused by the brightness. In this case, in relation to the reference image, a variation $\sigma(x, y)$ of the detected image expressed in a coordinate system is quantitatively estimated by the following equation, $$\sigma(x, Y)=(\sigma_f^2+\sigma_f^2)^{1/2} \qquad (1).$$

The concept of a processability Cp is a ratio of a reference width to an actual width processability is introduced, in such a manner so that a value of the processability which is larger than a predetermined value, which is, for example, 1.3, causes the product to pass. Various partial images based on basic geometrical shapes, such as a rectangle and a circle, as designated by numbers 1 to 15 in FIG. 3 were prepared, and tests were done to determine the respective values of the processability Cp of the respective reference images of numbers 1 to 15. Namely, each of the shapes of numbers 1 to 15 as the partial image is memorized on a pixel to pixel basis. A conformity determination is done between the partial image and the detected image, and the processability is calculated. According to the result of the tests, a partial image based only on the basic geometrical shapes in FIG. 3 cannot satisfy the requirement that the value of the processability Cp is larger than 1.3.

In the above test, it was found that, for the pattern P as shown in FIGS. 2-(a) and 2-(b), an arc shaped partial image as shown by the number 7 in FIG. 3 can provide the best result for conformity, although the value of the processability was still insufficient. In FIG. 4, a block 50 schematically illustrates a searching area, in which a pattern P is also schematically illustrated. It assumes that a partial image $W_1$, which corresponds to the number 7 in FIG. 3, is used for a measurement of a conformity. A result of the test of the nonconformity is shown by a table $T_1$ in FIG. 4. Namely, the table $T_1$ shows the values of nonconformity of the partial image $W_1$ with respect to the pattern P in the block 50. Numerals along the column x and the row y are the deviation of the partial image in terms of the number of pixels from the pattern. Namely, the numeral "0" shows that there is no nonconformity between the partial image and the pattern. The numeral "1" shows that there is a deviation of 1 pixel in a positive direction, while the numeral "−1" shows that there is a deviation of 1 pixel in negative direction. In the table $T_1$, the value of 0 of the brightness at the location (x, y=0, 0) means that there is no inconsistency between the image and the pattern. Conversely, at a location (x, y=−1, −1), the degree of the inconsistency in term of the brightness is 7. In short $T_1$ illustrates the values of the inconsistency in accordance with the deviation of the location of the partial image from the pattern in terms of number of pixels.

In table $T_1$, a change in the value of the inconsistency is small when the deviation occurs in the left and upward directions. Namely, the deviation from the center location x, y=0, 0 to the location x, y=−1, −1 causes the value of the nonconformity to be changed from 0 to 7. In other words, a value of the deviation in this direction is small, which causes the sensitivity to be reduced. Contrary to this, a change a brightness becomes much larger when the deviation occurs in a horizontal or vertical direction. For example, the deviation from the center location x, y=0, 0 to the location x, y=−1, 0 in left-side direction causes the value of the nonconformity to be changed from 0 to 16. In other words, a value of the deviation in this direction is large, which causes the sensitivity to be increased. In view of the above, it is concluded that the image of the pattern $W_1$ is less effective if it is used for a determination in left-upward direction. In other words, an increased sensitivity is obtained if used for a measurement in the vertical or horizontal direction.

In FIG. 4, a partial image $W_2$ corresponds to the pattern of the number 1 in FIG. 3, and table $T_2$ shows a result of the test of the nonconformity of the partial image $W_2$ with respect to the pattern P. From the table $T_2$, a fraction of a change in the value of the inconsistency is only obtained when the image $W_2$ is displaced in a horizontal direction. Namely, the deviation from the center location x, y=0, 0 to the location x, y=1, 0 causes the value of the nonconformity to be unchanged (0 to 0). Contrary to this, the dislocation from the center location x, y=0, 0 to the location x, y=−1, −1 in a left-upward direction causes the value of the nonconformity to be changed from 0 to 10. The image $W_2$ can only provide a reduced change in the values of the degree of the nonconformity in the right-side direction as shown by an arrow g in FIG. 4. In other words, the image $W_2$ is less sensitive to a measurement in the right-side direction.

In FIG. 4, table $T_3$ shows the result of a test of the nonconformity when both of the images $W_1$ and $W_2$ are used. In this case, the less effective direction f or g in the table $T_1$ or $T_2$ is improved. Namely, the addition of the partial image $W_2$ to the partial image $W_1$ can provide a higher value of the processability Cp (=1.0), which makes it possible that the less-effective direction between the partial images is improved. However, the addition of the partial image $W_2$ to the partial image $W_1$ causes the value of the area of the partial image to exceed the limit value. Thus, it is required that the size of the total image is maintained at a constant value.

A constant total area of, for example, 1024 pixels can be maintained by using a plurality of partial images when a reduced number of pixels in the partial images is used. In order to reduce the number of the pixels in the partial image, a partial image is divided into two sections. This will be explained with reference to FIGS. 5-(a) to (d) and FIG. 6. In FIG. 5-(a), the partial image $W_1$, which is similar to that in FIG. 4, is used for a pattern P. In this case, the process capacity $Cp_1$ is small. Namely, in FIG. 6, the partial image $W_1$ is divided into two sections A having a larger value of the process capacity $Cp_A$ (=0.6) and a section B of a smaller value of the process capacity $Cp_B$ (=0.2). Thus, the latter section B is, as shown in FIG. 5-(b), relocated so as to obtain a larger value of the process capacity $Cp_2$. These steps of division and relocation are repeated as shown in FIG. 5-(c) so as to obtain a larger value of the process capacity $Cp_3$. These steps are repeated until the 1024 pixels are arranged along the pattern so as to obtain a larger value of the process capacity $Cp_{1024}$. Such an arrangement of the pixels along the pattern allows the precision of the determination to be increased, while maintaining a constant value of the total number of pixels.

However, in the above mentioned division-relocation method, at each time of a division, a determination of the relocated position of the divided image by a scanning the entire image is necessary, which increases the calculation load, thereby making the method impractical. Thus, a key concept of the present invention is that, in place of the repetition of the division-and-relocation steps until the completion of the relocation of all of the 1024 pixels, a selection and a relocation of a pixel is done, on a pixel by pixel basis, until the completion of the selection of all of the 1024 pixels is. This is effectively increases the speed of the calculation by 1,000 times. Namely, according to the present invention, an increased processing speed is obtained while maintaining a desired precision of measurement.

A first embodiment of the present invention will be explained. FIGS. 7-(a) and (b) illustrate the entire construction of an apparatus for measuring a position of a pattern according to the present invention. The apparatus includes an error correction circuit 100 and a microcomputer unit 200 connected with the error correction circuit 100. As shown in FIGS. 7-(a) and (b), the error correction circuit 100 includes a first inlet port 60 for introducing a signal indicating a detected image, a second inlet port 61 for introducing a signal indicating a reference image, and first and second outlet ports 71 and 72 for issuing a signal corresponding to the inlet image after being subjected to the correction by the error correction circuit 100. In other words, an image with no deviation is issued from the outlet ports 71 and 72.

The error correction circuit 100 is provided with a signal receiving gate 103 and a first frame memory 111, which is connected to the inlet port 60 via the gate 103, so that the image to be detected from the inlet port 60 is stored in the first frame memory 111. The error correction circuit 100 is further provided with a second signal receiving gate 104 and a second frame memory 112 which is connected to the second inlet port 61 via the gate 104, so that the reference image from the second inlet port 61 is stored in the second frame memory 112.

An instruction register 102 is also provided in the error correction circuit 100. The instruction register 102 is connected to the signal receiving gates 103 and 104. An instruction from the microcomputer 200 operates the instruction register 102, which causes the gates 103 and 104 to be desirably opened.

The control circuit 100 is further provided with first and second address generating circuits 105 and 106. The first address generating circuits 105 is adapted for generating addressing signals to the first and second frame memories 111 and 112 during a data accessing operation to the memories. In this operation, the addressing signal from the first address generating circuit 105 makes the image data in the first and second frame memories 111 and 112 accessible. A second address generating circuit 106 is a unit for generating an addressing signal for sequentially reading out data from a matching coordinate memory 109, which will be fully explained later.

The error correction circuit 100 is further provided with an addressed data selection circuit 107, which is connected to the microcomputer 200 via a bus interface circuit 101. The microcomputer 200 issues an instruction which is transmitted, via the interface 101 and the addressed data selection circuit 107, to the matching coordinate memory 109. As a result, the addressed data selection circuit 107 enables switching between (1) a writing operation data related to the respective coordinate of pixels is written to the matching coordinate memory 109, in which the data correspond to a partial area of the reference image and which are effective for a measurement of a location of the detected image, and (2) a reading operation where data related to the respective coordinate of pixels is read out, from the matching coordinate memory 109, in which the data correspond to a partial area of the reference image and which are effective for a measurement of a location of the image. In other words, the matching coordinate memory 109 is a memory for storing data related to the coordinates of pixels which are effective for measuring a location of a partial area of a reference image. A determination of the partial area (pixels) of the reference image along a pattern is automatically done in accordance with the brightness data as will be fully described later.

The error correction circuit 100 is further provided with a coordinate buffer 108, which is connected via the address data selection circuit 107 to the second address generating circuit 106. Namely, the matching coordinate memory 109 includes coordinate data for respective pixels from which matching coordinate memory 109, the addressed data selection circuit 107 selects a coordinate data corresponding to the address designated by the second address generating circuit 106, which coordinate data is temporary stored in the buffer 108. A scanning address generating circuit 110 used for making a match is connected to the coordinate buffer 108. Namely, the scanning address generating circuit 110 functions to scan the coordinate data temporarily stored in the coordinate buffer 108 in x and y directions of the detected image, so that values of an offset, i.e., deviations in x and y directions are issued in a sequential manner. An adder 113 is connected to the coordinate buffer 108 and the matching-scanning address generating circuit 110, so that an addition of the coordinate data from the buffer 108 and the offset values from the circuit 110 is performed, and the added value is issued to the first frame memory 111.

A brightness difference calculating circuit 114 has inputs connected to the first and second frame memories 111 and 112, respectively, so that a difference in the brightness is calculated and the calculated difference in the brightness is issued to a bright difference accumulator 115. At the brightness difference accumulator 115, an addition of the brightness difference data from the brightness difference calculating circuit 114 and a brightness difference data from a brightness difference accumulating memory 116 is performed for each offset value issued from the matching-scanning address generating circuit 110, and the added brightness difference value is issued to the brightness difference accumulating memory 116. The brightness difference accumulating memory 116 functions as a memory for storing the added bright difference data from the brightness difference accumulator 115.

The error correction circuit 100 further includes a circuit 117 for a determination of a conformity which is connected to the brightness difference, accumulator 115 and the brightness difference accumulating memory 116. The conformity determining circuit 117 functions to scan the data of the brightness difference stored in the brightness difference accumulating memory 116, to detect the minimum value of the brightness difference, and issues, to a deviation amount register 118, the deviation value stored in the address corresponding to the detected minimum value. In other words, the deviation amount register 118 is for storing the data related to the deviation issued from the conformity determining circuit 117.

Finally, the error correction circuit 100 includes a third address generating circuit 119 which is arranged between the deviation amount register 118 and the first memory frame 111, and a fourth address generating circuit 120 which is arranged between the deviation amount register 118 and the second memory frame 112. The third address generating circuit 119 functions, in response to the deviation amount issued from the deviation amount register 118, to generate the address of the first frame memory 111 for cancelling the deviation. The fourth address generating circuit 120 functions, in response to the deviation amount issued from the deviation amount register 118, to generate the address of the second frame memory 112 for cancelling the deviation. As a result of the correction of the error at the error correction circuit 100, images with no deviation are issued from the first and second outlet ports 71 and 72.

FIGS. 8-(a) to (e) illustrate, schematically, how a measurement of a location of a pattern is accomplished during a pattern matching operation in the first embodiment. In FIGS. 8-(a) and (b), X indicates a reference image, while, in FIGS. 8-(c) to (d), Y indicates an image to be detected. In FIG. 8-(a), pixels A to E are locations which are suitable for a measurement of the location of the pattern. The pixels A to E are purely for illustration purposes. Namely, in detail, such pixel of a total numbers of 1024 are automatically designated along a pattern as will be fully described later.

In FIG. 8-(b), these locations of the pixels A to E are shown together with their coordinates $(x_1, y_1)$ to $(x_5, y_5)$. FIGS. 8-(c) to (e) illustrate how the evaluation of the conformity between the reference image X (the pixels A to E) and the detected image Y is done. Namely, FIG. 8-(c) illustrates a condition that the degree of the conformity is small, FIG. 8-(d) a condition that the degree of the conformity is medium, and FIG. 8-(e) a condition that the degree of the conformity is high. As shown by an arrow in FIG. 8-(c), a scanning of the detected image Y is done while a difference in brightness between the reference image (pixels A to E) and the detected image is detected. The location of the minimum value of the brightness difference is detected. This value corresponds to the deviation of the detected image Y from the reference image.

Now, a determination of the conformity according to the first embodiment of the present invention will be explained with reference to FIGS. 7-(a) and (b) and 8-(a) to (e). First, based on the instruction from the microcomputer 200, the signal receiving gate 104 is opened. This opening allows the data related to the brightness of the reference image stored in a suitable storing medium (not shown) to be introduced, via the inlet port 61, under a sequential basis, into the second frame memory 112 based on addressing signals generated by the first address generating circuit 105. Furthermore, based on the instruction from the microcomputer 200, the signal receiving gate 103 is opened. This allows the data, related to the brightness of the image as detected by a suitable means such as a camera and stored in a suitable storing medium (not shown) to be introduced, via the inlet port 60, on a sequential basis, into the first frame memory 111 based on addressing signals generated by the first address generating circuit 105. The image data stored in the first and second frame memory 111 and 112 is data of brightness in the coordinate system (x, y). Namely, the data is constructed by data of brightness at each of coordinate locations (x, y). For example, at a location in the shaded area in the reference image x in FIG. 8-(a), the brightness would be small, while, at a location in a blank area in the reference image X in FIG. 8-(a), the brightness would be high. At each of the coordinate point (x, y), the brightness is expressed by brightness data having 256 levels.

Next, from the reference image stored in the second frame memory 112, data of the respective coordinate points $A(x_1, y_1)$ to $E(x_5, y_5)$, i.e., 1024 pixel points which are suitable for a measurement, are moved to the matching coordinate memory 109. As explained above, in FIG. 8-(b), the pixels A, B, C, D and E along the pattern are employed, and coordinates of these positions are expressed by $(x_1, y_1)$, $(x_2, y_2)$, $(x_3, y_3)$, $(x_4, y_4)$ and $(x_5, y_5)$, respectively.

After the completion of the storage of the coordinate data of all of the reference pixels (A to E, i.e., 1024 pixels) in the matching coordinate memory 109, the microcomputer 200 issues an instruction which causes the address data selection circuit 107 to be connected to the second address generating circuit 106 and the coordinate buffer 108 so that the second address generating circuit 106 issues an addressing signal. Based on the address signal from the second address generating circuit 106, the matching coordinate memory 109 issues a signal related to the coordinate $(x_1, y_1)$, i.e., position of the pixel A to the coordinate buffer 108. Then, the coordinate buffer 108 temporally stores the coordinates $(x_1, y_1)$ of the pixel A. From the coordinate buffer 108, an instruction of the coordinates $(x_1, y_1)$ of the pixel A is given to the second frame memory 112, while the coordinate $(x_1, y_1)$ of the pixel A is issued to the adder 113. Based on the instruction as to the coordinates $(x_1, y_1)$ of the pixel A, the second frame memory 112 issues data of the brightness of the coordinates $(x_1, y_1)$ of the pixel A to the brightness difference calculating circuit 114.

The matching-scanning address generating circuit 110 scans the detected image based on the position of the pixel A in x and y directions and issues, in a sequential manner, the offset values, which are the deviations with respect to the position of the pixel A in the x direction of a value $\Delta x$ in terms of a number of pixel in a range between −8 and +7 and in the y direction of a value $\Delta y$ in terms of a number of pixel in a range between −8 and +7. FIG. 9 illustrates how the scanning is done. Namely, in FIG. 9, the origin of the coordinates (x, y) is designated by the point $O_0$ of the reference image. From the origin $O_0$, the first pixel A is located at of a distance $x_1$ in the x direction and at a distance $y_1$ in the y direction. In FIG. 9, a scanned location is designated by U which is in a distance $\Delta x$ in the x direction and $\Delta y$ in the y direction from the position $(x_1, y_1)$ of the pixel A. At each of the scanned positions $U(\Delta x, \Delta y)$, a detection of the brightness of the image to be detected is performed, which is compared with the brightness of the pixel A of the reference image. As will be explained later, from the scanned position providing the minimum value of the accumulated brightness difference, a deviation (offset) of the detected image from the reference image can be determined. As explained above, the scanning is done in a range −8 to +7 pixels in x and y directions. Namely, the value of $\Delta x$ and $\Delta y$ is varied in a range between −8 and +7. In other words, a scanning of 16 steps (pixels) are done in both of x and y directions so that measurements of the brightness of the detected image are done at 16×16 (=256) points with respect to each of selected points A to E (1024 pixels) of the reference image, as will be fully explained later.

At a first step of the scanning, the offset amount having a value of, for example, (−8, −8) is issued from the matching-scanning address generating circuit 110 to the summation unit 113. The summation unit 113 latter executes a summation of the coordinates $(x_1, y_1)$ of the reference pixel A issued from the coordinate buffer 108 with the offset (−8, −8) issued from the matching-scanning address generating circuit 110 so that a data of the coordinates, which is equal to $(x_1-8, y_1-8)$, which corresponds to the coordinate of the scanned position U is issued from the summation unit 113 to the first frame memory 111 (see FIG. 9). Then, based on the instruction of the coordinates $(x_1-8, y_1-8)$ from the summation unit 113, the first frame memory 111 issues the data T at the scanned location $(x_1-8, y_1-8)$ of the detected image to the brightness difference calculating circuit 114.

When the data of the brightness M at the coordinate $(x_1, y_1)$ of the pixel A of the reference image and the data T of the brightness at the coordinates $(x_1-8, y_1-8)$ of the detected image are issued to the brightness difference calculating circuit 114, the circuit 114 calculates the absolute value $d_1(-8, -8)$ of the difference in the brightness between the pixel A and the detected image Y by the following equation.

$$d_1(-8, -8)=|T(x_1-8, y_1-8)-M(x_1, y_1)| \quad (2)$$

The above equation means that larger the deviation amount (−8, −8), i.e., the larger the error, the larger the absolute value $d_1(-8, -8)$ of the difference in the brightness is. Contrary to this, the smaller the deviation amount (−8, −8), i.e., the smaller the error, the smaller the absolute value $d_1(-8, -8)$ of the difference in the brightness is.

Next, the brightness difference accumulator 115 reads out, from the address related to the coordinate (−8, −8) instructed by the matched address generator 110, data S(−8, −8) related to the accumulated brightness difference, to which the deviation value of $d_1(-8, -8)$ from the bright difference calculating circuit 114 is accumulated by using the following equation.

$$S(-8, -8)=S(-8, -8)+d_1(-8, -8) \quad (3)$$

The thus accumulated brightness difference data S(−8, −8) are moved to the same address related to the coordinate (−8, −8). In other words, the old data is replaced by the newly calculated data.

At the next step, the matched address generator 110 instructs a next scanning point or offset point (−7, −8), and the above mentioned steps are repeated. As a result, at the offset point (−7, −8), an absolute value of the brightness difference $d_1(-7, -8)$ and the accumulated brightness difference S(−7, −8) are calculated by the following equations.

$$d_1(-7, -8)=|T(x_1-7, y_1-8)-M(x_1, y_1)| \quad (4)$$

$$S(-7, -8)=S(-7, -8)+d_1(-7, -8) \quad (5)$$

The above mentioned steps are repeated, so that the absolute brightness differences as well as accumulated brightness difference are calculated at all of the offset points. In other words, a 256 value set of data of the absolute brightness differences are obtained. In this example, at the final step, the absolute brightness differences and the accumulated brightness difference at the offset point (+7, +7) are calculated by the following equations.

$$d_1(+7, +7)=|T(x_1+7, y_1+7)-M(x_1, y_1)| \quad (6)$$

$$S(+7, +7)=S(+7, +7)+d_1(+7, +7) \quad (7)$$

At the next step, the second address generating circuit 106 instructs the coordinates $(x_2, y_2)$ of the pixel B (FIG. 8-(b)) of the matching coordinate memory 109. Then, as explained with reference to the coordinates $(x_1, y_1)$ of the pixel A, a similar scanning operation is performed so that the absolute values of the brightness difference and accumulated brightness difference are calculated for the 256 offset points $(\Delta x, \Delta y)$ with respect to the coordinates $(x_2, y_2)$ of the pixel B.

Then, the second address generating circuit 106 instructs the coordinates $(x_3, y_3)$ of the pixel C (FIG. 8-(b)) of the matching coordinate memory 109. Then, as explained with reference to the coordinates $(x_1, y_1)$ of the pixel A, the scanning operation is done, so that data as to absolute values of the brightness difference and accumulated brightness difference are calculated for 256 offset points $(\Delta x, \Delta y)$ with regard to the coordinates $(x_3, y_3)$ of the pixel C.

Then, the second address generating circuit 106 instructs the coordinates $(x_4, y_4)$ of the pixel D (FIG. 8-(b)) of the matching coordinate memory 109. Then, as explained with reference to the coordinates $(x_1, y_1)$ of the pixel A, data as to absolute values of the brightness difference and accumulated brightness difference are calculated for the 256 offset points $(\Delta x, \Delta y)$ with regard to the coordinates $(x_4, y_4)$ of the pixel D.

Then, the second address generating circuit 106 instructs the coordinate $(x_5, y_5)$ of the pixel E (FIG. 8-(b)) of the matching coordinate memory 109. Then, as explained with reference to the coordinates $(x_1, y_1)$ of the pixel A, data as to absolute values of the brightness difference and accumulated brightness difference are calculated for the 256 offset points $(\Delta x, \Delta y)$ with regard to the coordinates $(x_5, y_5)$ of the pixel E.

Generally, when the second address generating circuit 106 instructs the coordinates $(x_i, y_i)$ of the matching coordinate memory 109, a scanning operation is done in a range of −8 pixel and +7 pixels with respect to each of the selected locations $(x_i, y_i)$ of the reference image, in such a manner that at each of the scanned positions, the brightness of the detected image is detected. Then, data as to absolute values of the brightness difference and accumulated brightness difference are calculated for all of 256 offset points $(\Delta x, \Delta y)$ with respect to the coordinates $(x_i, y_i)$ of the pixel.

After completion of the calculation of the absolute values of the brightness difference and accumulated brightness difference for all of the selected pixels of the reference image at respective locations $(x_1, y_1)$ to $(x_i, y_i)$ of the matching coordinate memory 109, the brightness difference accumulating memory 116 calculates a brightness difference accumulated data $S(\Delta x, \Delta y)$ for all of the deviation amounts $(\Delta x, \Delta y)$, i.e., a matching evaluation value by the following equation. The result of the accumulation is stored to the brightness difference accumulating memory 116.

$$S(\Delta x, \Delta y) = \Sigma_i d_i(\Delta x, \Delta y), \quad (8)$$

where $\Delta x$ and $\Delta y$ are in a range between $(-8, -8)$ to $(+7, +7)$, and i is the selected pixel's number.

From the value of the brightness difference accumulated data $S(\Delta x, \Delta y)$, an evaluation of the degree of the matching can be done in the following way. Namely, when the scanned location $(\Delta x, \Delta y)$ is such that the reference image X (the selected pixels A to E) is completely miss-matched with the detected image Y to be detected as shown in FIG. 8-(c), the accumulated brightness difference $S(\Delta x, \Delta y)$ will have a larger value. Conversely, when the scanned location $(\Delta x, \Delta y)$ comes to close to the pattern of the detected image as shown in FIG. 8-(d), the value of $S(\Delta x, \Delta y)$ will be drastically reduced. When the scanned image is at a scanned location $(\Delta x, \Delta y) = (\Delta x_e, \Delta y_e)$ where a complete match is obtained as shown in FIG. 8-(e), the value of the $S(\Delta x, \Delta y)$ will be minimized to $S(\Delta x_e, \Delta y_e)$.

Upon the completion of the measurement of the matching evaluation value $S(\Delta x, \Delta y)$ by the scanning (of 256 scans) at all of the selected points (of 1024 pixels) of the reference image, the conformity determining circuit 117 scans all of the data stored in the memory 116. The circuit 117 issues, as the measured value of the deviation amount, the deviation amount $(\Delta x_e, \Delta y_e)$ which provides the minimum value $S(\Delta x_e, \Delta y_e)$ of the matching evaluation value $S(\Delta x, \Delta y)$ which is stored in the deviation amount register 118.

Then, the third address generating circuit 119 generates, based on the deviation amount from the deviation register, an address signal to the first frame memory 111, which can cancel the deviation amount. The fourth address generating circuit 120 generates, based on the deviation amount from the deviation register, an address signal to the second frame memory 112, which can cancel the deviation amount. As a result, the error correction by means of the error correction circuit 100 can issue image signals with no deviation from the outlet ports 71 and 72.

In general, according to the operation of the error correction circuit 100 in FIGS. 7-(a) and (b), coordinate data $(x_1, y_1), (x_2, y_2), (x_3, y_3), \ldots, (x_i, y_i)$ of all pixels, which are suitable for measuring a position of a pattern in the reference image, is stored in the matching coordinate memory 109. The matching and scanning address generating circuit 110 scans each of the pixels in x and y directions of the detected image so that offset $(\Delta x, \Delta y)$ between the detected image and the reference image are issued in a sequential manner. The brightness difference circuit 114 calculates, at each of the offset position (scanned position), the difference between the brightness data stored at the first frame memory 111 and the brightness data stored at the second frame memory 112 by using an equation such as designated by (2) or (4). The brightness difference accumulation memory 116 stores, for each of the offset position $(\Delta x, \Delta y)$, brightness difference data or matching evaluation values $S(\Delta x, \Delta y)$. The conformity determination circuit 117 scans all of the data stored in the brightness difference accumulation memory 116, in order to determine offset location $(\Delta x_e, \Delta y_e)$ which provides the minimum value $S(\Delta x_e, \Delta y_e)$ of the matching evaluation values $S(\Delta x, \Delta y)$. The minimum value is, as the measured amount of the deviation value, output to the deviation amount register 118. Furthermore, in accordance with the offset position $(\Delta x_e, \Delta y_e)$ issued from the deviation amount register 118, the third address generating circuit 119 issues, to the first frame memory 111, an address signal which can cancel the offset $(\Delta x_e, \Delta y_e)$ of the detected image from the reference image. Similarly, in accordance with the offset $(\Delta x_e, \Delta y_e)$ issued from the offset register 118, the fourth address generating circuit 120 issues, to the second frame memory 112, an address signal which can cancel the offset $(\Delta x_e, \Delta y_e)$. As a result, deviation-less images are issued from the outlet ports 71 and 72, while the measuring time is shortened and a desired precision is maintained.

Automatic Selection of Pixels in Reference Image

Now, an automatic determination of the pixel A to E which is suitable for the above measurement process will be fully explained. It is possible that the designation of the pixels, such as A to E in FIG. 8-(a) in an image, which are effective for measurement of the deviation can be made manually. However, this is not desirable in case where measurements of a multiple of types of products are needed. Namely, such a manual registration of a large number of patterns requires a lot of work morever, the precision of the measurement is likely to be reduced when a selection of the location of the pixels in the reference images by an operator is improper. In other words, it may be possible that difference in operators causes a measurement error to increase.

Figures 10, 11:
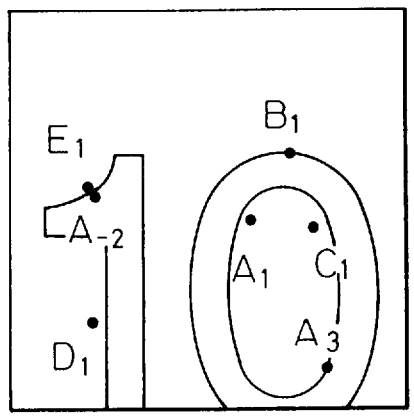
FIG. 10 illustrates candidate pixels along a pattern in a reference image in an embodiment of the present invention.
FIG. 11 is a diagram showing the order of the candidate pixels in various directions in a coordinate system.

In view of the above mentioned difficulty, an automatic designation of the positions of pixels which are effective for the measurement of a deviation can be done in the following way. Namely, FIGS. 10 to 11 illustrate the automatic designation of positions of pixels in the reference image, which are effective for a measurement of the deviation, while maintaining the efficiency of the calculation.

First, the scanning of an input image including a predetermined number of pixels of, for example, 50,000 is done, so that a candidate of positions of pixels suitable for the deviation measurement $A_1, B_1, C_1, D_1, \ldots, A_2, B_2, C_2, D_2, \ldots, A_3, B_3, C_3, D_3, \ldots$ are selected. In FIG. 10, a reference image includes a pattern of numeral 10, and some candidate pixels are designated. It is, then, assumed that there are changes in a brightness at a location adjacent the selected pixel in various directions. In this case, it is considered that the direction which is the most effective for the selected pixel is the one which, among the changes of the brightness, provides the largest value of such change, and that larger the change, the more the selected pixel is effective for the deviation measurement in that direction. Thus, it can be concluded that the standard of the selection of the positions of the pixels is such that the selection is done in the order of the degree of the change from the pixel of a larger value. Namely, for each of the selected candidates of the pixels suitable for a measurement of the deviation, that are $A_1, B_1, C_1, D_1, \ldots, A_2, B_2, C_2, D_2, \ldots, A_3, B_3, C_3, D_3, \ldots$, searching for a sensitive direction is accomplished. Then, the registration of the pixels is performed for each of sensitive directions in the order of an increase in sensitivity. FIG. 11 illustrates schematically how this registration is done. Namely, in FIG. 11, arrows in the rows illustrate various effective directions for every 45 degree spacing, while numerals 1, 2, 3, ... in respective columns illustrate order of selected pixels in relation to the sensitivity in a measurement. For example, for the left-upward direction, the order of the degree of the effectiveness of the pixels is $A_1, A_2, A_3, \ldots$ and, for the vertical upward direction, the order of the degree of the effectiveness of the pixels is $B_1, B_2, B_3, \ldots$, etc.

Figure 12:
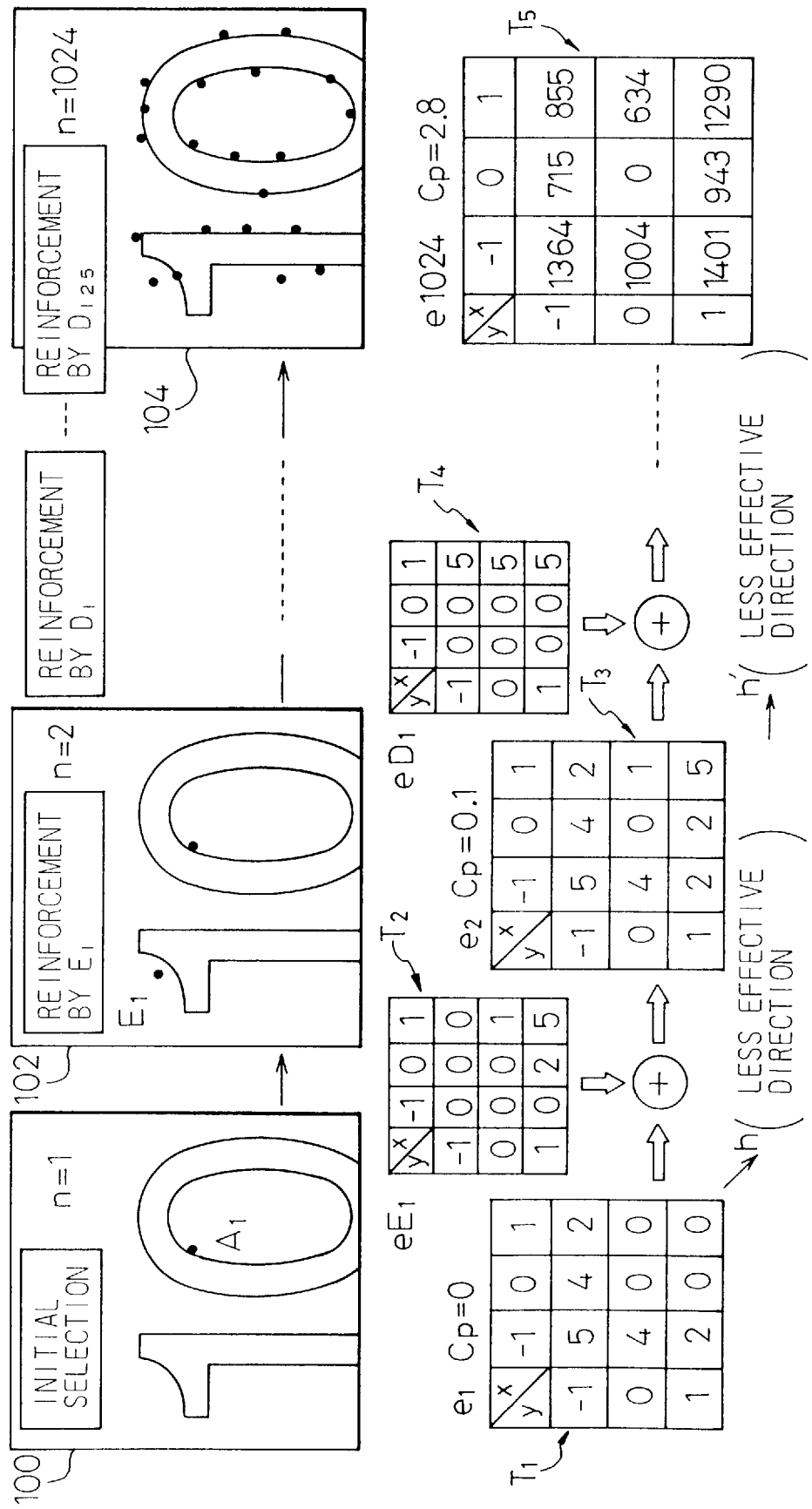
FIG. 12 illustrates a method for an automatic determination of pixels constructing a partial image according to the present invention.

Next, from these candidate pixels, a pixel such as the pixel $A_1$ in a block 100 showing the reference image in FIG. 12 is first selected. The selected pixel $A_1$ is an initial pixel $e_1$ in a partial image to be selected. Table $T_1$ in FIG. 12 shows how the brightness is varied in an area around the selected pixel $e_1 (= A_1)$ in the x and y directions. Namely, numerals in column (x) and in row (y) illustrate deviation in terms of pixels from the selected point. In this initial condition (n=1), the process capability Cp=0. From the table $T_1$, it is considered that the right-bottom direction as shown by an arrow h is not effective for measurement purpose. Namely, the brightness at the center point (0, 0) is 0, while the brightness at the point (1, 1) is 0. Namely, the brightness is unchanged in the direction h. From FIG. 11, for this direction h, it is considered that the point $E_1$ is sensitive. Table $T_2$ similarly shows data of brightness in an area around the point $E_2$ in the x and y directions. In order to improve the measurement reliability in this direction h, this point $E_1$ is selected as second point $e_{E2}$ in the partial image $e_2$ at the second stage n=2. Table $T_3$ shows the brightness in x and y directions as to the partial image $e_2$ comprised of the point $e_1$ and $e_{E1}$. From the table $T_3$, it is considered that the partial image $e_2$ is less sensitive for the measurement in a right-side direction as shown by an arrow h'. From FIG. 11, the pixel $D_1$ is effective in this direction. Table $T_4$ shows the similar table. Thus, to $e_2$, the point $D_1$ is added as a new point $e_{D1}$, thereby obtaining the partial image $e_3$ in the third stage (n=3). These steps are repeated 1024 times (n=1024), thereby obtaining the final partial image $e_{1024}$ as shown by a block 104 in FIG. 12. Table $T_5$ shows, for this final partial image $e_{1024}$, the brightness in relation to offset in x and y directions in term of number of pixels. This table $T_5$ shows that the finally determined partial image is effective for every direction since the value of the brightness is largely changed even when a pixel of offset in any direction occurs. Namely, the value of the process capability of Cp of the finally selected partial image $e_{1024}$ is increased to 2.8.

In short, the above explained automatic selection of points for obtaining a partial image allows the precision to be highly increased, while eliminating tiresome manual work, thereby enhancing productivity.

Second Embodiment

In the above first embodiment, the matching-scanning address generator 110 issues data of offset value between (−8, −8) to (+7, +7), i.e., 256 offset positions (Δx, Δy) in total as explained with reference to FIGS. 8-(a) to (e). In this case, the measured deviation can have one of 256 different values, thereby requiring 256 matching operations for determining difference in brightness values between the reference image and the detected image. A wider range for measuring can be employed by changing the offset value in a range, for example, between (−32, −32) and (+31, +31). In this case, a range of a measurable deviation is increased to 64×64=4096. However, the load for the calculation and the time for processing will be increased to 16 times over that required when the error correction circuit in the first embodiment is used.

Figure 13:
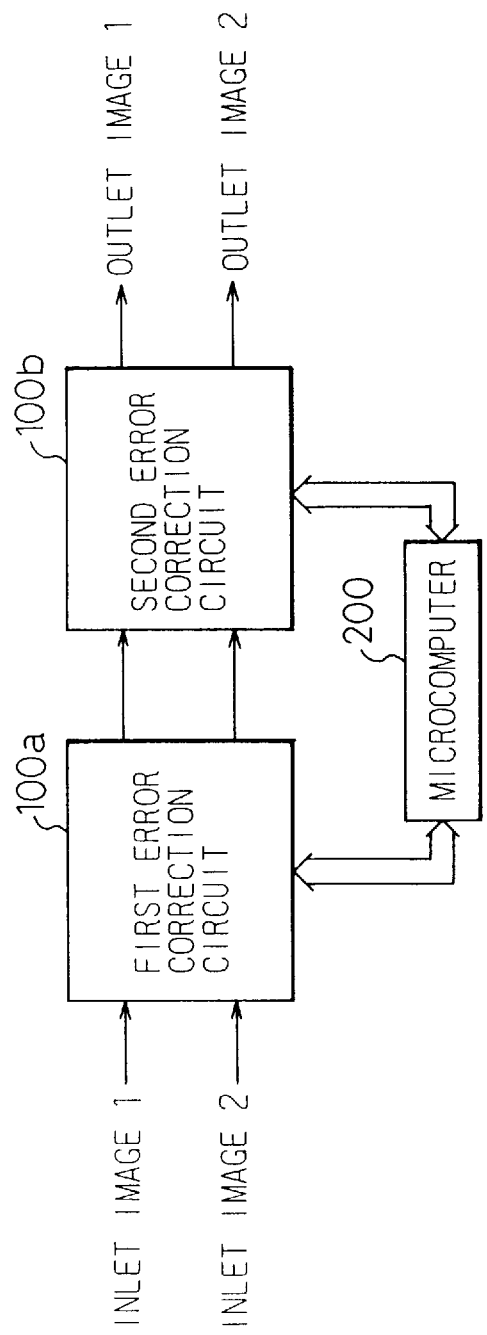
FIG. 13 shows a pipelining arrangement in a second embodiment of the present invention.

Thus, as a first modification of the above embodiment, the matching-scanning address generating circuit 110 is modified in such a manner that the offset is issued for every 4 pixels like (−32, −32), (−28, −32), . . . , (+31, +27) and (+31, +31), which allows the measurable offset values (16×16= 256) to be unchanged and the calculating load to also be unchanged. However, in this case, scanning is done for every 4 pixels so that the measuring error is increased from the precision of ±1 pixel in the first embodiment to ±4 pixel. In order to prevent such an increase in the measuring error from being generated in this modification, the error correction circuit is modified to a two stage construction as shown in FIG. 13, which is constructed by a first error correction circuit 100a and a second error correction circuit 100b. In this case, the first error correction circuit 100a is constructed such that addressing the matching-scanning address circuit can be done for every 4 pixels, while the second correction circuit 100b is constructed such that addressing the matching-scanning address circuit can be done for every pixel. Namely, in this modification, a rough measurement of the deviation at a spacing of 4 pixel is done by means of the first error correction circuit 100a, followed by a fine measurement at a spacing of a pixel by means of the second error correction circuit 100b. The provision of the two stage arrangement of the error correction circuits 100a and 100b causes the number of calculations to doubled.

This embodiment is effective when two different images are processed by using a so-called pipelining technique. Namely, at a first time, an input of a first image to the first circuit 100a is done for rough processing for every space of 4 pixels. At a second time, a fine processing of the first image is done for every pixel at the second error correction circuit 100b. During the processing of the first image at the second circuit 100b, processing of the second image is done at the first circuit 100a. Due to such a pipelining technique, the processing of the two input images are done while maintaining the same calculation speed.

In short, in the second embodiment, the employment of the two stage arrangement of the error correction circuit allows the measurement range to be increased to, for example, (−32, −32) to (+31, +31), resulting in an increase in the precision, while maintaining the same processing speed.

Third Embodiment

In the first embodiment, an instruction of the coordinate $(x_i, y_i)$ of all of the pixel is done by the matching-addressing circuit 110 on a pixel to pixel basis. In other words, a designation of the coordinate is done for each pixel. A modification described hereinbelow includes the groups the pixels and a designation of the coordinates to be done on group to group basis. In other words, a designation of the coordinates is done for each group. As shown in FIGS. 14-(a) to (e), for coordinates $(x_a, y_a)$ of the pixel $A_1$, coordinates $(x_{a+1}, y_{a+1})$ of the pixel $A_2$ adjacent the pixel $A_1$ is issued. For a coordinates $(x_b, y_b)$ of the pixel $B_1$, coordinates $(x_{b+1}, y_{b+1})$ of the pixel $B_2$ adjacent the pixel $B_1$ is issued. For a coordinates $(x_c, y_c)$ of the pixel $C_1$, coordinates $(x_{c+1}, y_{c+1})$ of the pixel $C_2$ adjacent the pixel $C_1$ is issued. For a coordinates $(x_d, y_d)$ of the pixel $D_1$, a coordinates $(x_{d+1}, y_{d+1})$ of the pixel $D_2$ adjacent the pixel $D_1$ is issued. For a coordinates $(x_e, y_e)$ of the pixel $E_1$, coordinates $(x_{e+1}, y_{e+1})$ of the pixel $E_2$ adjacent the pixel $E_1$ is issued.

In this construction, sets of coordinates $(x_i, y_i)$ and $(x_{i+1}, y_{i+1})$ are used, which causes the data to be stored in the matching coordinate memory 109 to be reduced to a half, thereby reducing the memory used for the matching coordinate memory 109.

Fourth Embodiment

FIGS. 15-(a) and (b) illustrate a fourth embodiment, which is directed to an apparatus for measuring a position of a pattern according to the present invention. In the first embodiment, the error correction circuit 100 issues, from the outlet ports 60 and 61, a signal of corrected deviation after the correction of the error. This fourth embodiment features that only an offset of the detected image from the reference image is issued.

An explanation of parts in FIGS. 15-(a) and (b) having the similar functions as that in FIG. 1 is eliminated. The same reference numerals label identical parts. Furthermore, the embodiment in FIGS. 15-(a) and (b) lack the second frame memory 112, the inlet port 61, the outlet port 71 and the third and fourth address generating circuits 119 and 120 in FIG. 1. In the above first and second embodiments, the data related to the brightness of the reference image are stored in the second frame memory 112. However, the second frame memory may be eliminated, and a microcomputer 200 can be used for storing the data related to the brightness of the reference image. As a result, the data of the brightness is stored in the matching coordinate memory 109.

Now, an operation of the second embodiment will be explained with reference to FIGS. 15-(a) and (b). First, data of coordinates and data of a 256 point class brightness at the respective coordinates of a reference image stored in a storage medium are moved to the microcomputer 200. The second address generating circuit 106 generates addressing signal. The data stored in the microcomputer, data of coordinates and data of 256 value brightnesses at partial areas of the reference image, which are effective for a measurement of the position of the pattern, are moved to and stored in the matching coordinate memory 109 on a sequential basis. Furthermore, based on the instruction from the microcomputer 200, the signal receiving gate 103 is opened, so that data of 256 value brightnesses of a detected image obtained by a camera are taken via the inlet port and moved to the frame memory 111 on a sequential basis.

Upon a completion of storage of the data of the coordinate of all of the pixels and brightness at the coordinates to the matching coordinate memory 109, the microcomputer 200 issues an instruction, which causes the address data selection circuit 107 to be connected with the second address generating circuit 106 and the coordinate buffer 108. Thus, similar to the first embodiment, the second address generating circuit 106 issues an addressing signal, which first instructs a coordinates $(x_1, y_1)$ of the pixel A in FIG. 8-(b). Based on the addressing signal from the second address generating circuit 106, the matching coordinate memory 109 issues the data of the brightness $M(x_1, y_1)$ at the coordinate $(x_1, y_1)$ of the pixel A to the brightness difference calculating circuit 114. Furthermore, the matching coordinate memory 109 issues the coordinate $(x_1, y_1)$ of the pixel A to the coordinate buffer 108, so that the latter temporarily stores the coordinates $(x_1, y_1)$. Thus, the coordinates $(x_1, y_1)$ of the pixel A is issued to the adder 113. Similar to the first embodiment, the matching-scanning address generating circuit 110 scans the pixel A in both of the x and y directions so that offset values in term of the number of pixels are, in a sequential manner, issued at all of the locations in the coordinate system which are available for the measurement. Namely, the offset value corresponds to the deviation $\Delta x$ or $\Delta y$ in the number of pixels from the location of the pixel A of the reference image in the x or y direction. Namely, the deviation of the detected image from the reference image is expressed in the coordinate system by $(\Delta x, \Delta y)$. In this embodiment, the offset (deviation $\Delta x$ or $\Delta y$) can be varied in a range between –8(pixel) to +8(pixel). In other words, the scanning is done in an area of 16×16 pixels about the position of the pixel A of the reference image. During the scanning, the matching-scanning address generating circuit 110 issues, first, m offset amount (–8, –8) to the adder 113. The adder 113 adds offset amount (–8, –8) to the coordinates $(x_1, y_1)$ of the pixel A issued from the coordinates buffer 108, so that offset coordinates $(x_1-8, y_1-8)$ is issued to the frame memory 111. Based on the instruction of the coordinate $(x_1-8, y_1-8)$, the frame memory 111 issues the brightness data $T(x_1-8, y_1-8)$ at the coordinates $(x_1-8, y_1-8)$ of the detected image.

In the similar way, as explained with reference to the first embodiment, the steps for calculations using the equations (2) to (8) are repeated, so that a measurement of the matching evaluation value $S(\Delta x, \Delta y)$ is executed. Upon the completion of the measurement of the matching evaluation value $S(\Delta x, \Delta y)$, the matching determination circuit 117 scans all of the data stored in the brightness difference accumulation memory 116, so that the deviation amount $(\Delta x_e, \Delta y_e)$, which provides the minimum $S(\Delta x, \Delta y)$ of the matching evaluation value, is issued and is stored in the deviation amount register 118, from which the deviation amount is issued to the outlet port.

In the above fourth embodiment, the second base frame 112, the second inlet port 61, the outlet port 72, and the third and fourth address generating circuits 119 and 120 in the first embodiment are eliminated and the brightness data is also stored to the matching coordinate memory 109 while the deviation amount between the detected image and the reference image is issued to the outlet port 71. As a result, a simplified construction is realized, while maintaining a desired precision of the measurement of the deviation between the detected image and the reference image and preventing the processing time from being prolonged.

We claim:

1. A method for measuring a deviation of a detected image from a reference image by using a partial area of the reference image, said images having patterns, respectively, the pattern of the reference image at said partial area being compared with the detected image to obtain the deviation, said method comprising:

obtaining the reference image;

selecting said partial area of the reference image along the pattern of the reference image based on a degree of a change in brightness at an area around a selected area;

memorizing locations of all pixels forming the selected partial area of the reference image;

scanning, in a desired offset range from the memorized locations of the pixels forming the selected partial area, the detected image so as to obtain brightness data at said offset range of the detected image;

calculating, at each position of the detected image which is scanned, a difference in brightness between the detected image and the reference image; and determining, based on the brightness differences across an entirety of the offset range, a deviation of the detected image from the reference image;

wherein said selecting comprises:

selecting candidate pixels distributed along the pattern of the reference image;

detecting for each of the candidate pixels changes in brightness in various directions;

arranging, for each of the directions, the candidate pixels in the order of the changes in brightness;

selecting pixels from the candidate pixels;

determining for one of the selected pixels a direction where a measurement of deviation is less sensitive, selecting a further pixel which is sensitive for a measurement of deviation in the direction which is determined at the preceding step to be less sensitive; and repeating the preceding determining and selecting steps until all of the pixels forming the detected partial area are selected.

2. A method according to claim 1, wherein said determining comprises accumulating, at said each position of the detected image which is scanned, the brightness differences for all of the pixels corresponding to said each position of the detected image which is scanned, determining a minimum value of the accumulated difference, and issuing the deviation which corresponds to the offset value providing the minimum value of the accumulated difference.

3. A method according to claim 1, wherein said memorizing comprises memorizing coordinates of all of the pixels of the reference image at the selected partial area, and memorizing, on a coordinate to coordinate basis, values of the brightness of all of the pixels of the reference image at the selected partial area.

4. A system for measuring a deviation of a detected image from a reference image by using a partial area of the reference image, said images having patterns, respectively, the pattern of the reference image at said partial area being compared with the detected image to obtain the deviation, said system including an error correction device comprising:

detected image memory means for storing, on a coordinate to coordinate basis, brightness data of the detected image;

reference image memory means for storing, on a coordinate to coordinate basis, brightness data of the reference image;

means for selecting said partial area of the reference image automatically along the pattern of the reference image based on a degree of a change in the brightness at an area around the partial area;

matching coordinate memory means for storing data of locations of all pixels forming said selected partial area of the reference image;

means, based on the stored data in the matching coordinate memory means, for scanning an area of the detected image corresponding to a range of offsets to obtain the brightness data of the detected image, the brightness data of the detected image being stored in said detected image memory means;

means for calculating a difference between the brightness data stored in the reference image memory means and the brightness data stored in the detected image memory means; and means, based on the calculated differences obtained at each position scanned in the area of the detected image corresponding to the range of offsets, for determining the deviation of the detected image from the reference image;

wherein said selecting means comprises means for:

selecting candidate pixels distributed along the pattern of the reference image;

means for detecting for each of the candidate pixels changes in brightness in various directions;

means for arranging, for each of the directions, the candidate pixels in the order of the changes in brightness;

means for selecting pixels from the candidate pixels;

means for determining for one of the selected pixels a direction where a measurement of deviation is less sensitive;

means for selecting a further pixel which is sensitive for a measurement of deviation in the direction which is determined at the preceding step to be less sensitive; and means for repeating the preceding determination and selection until all of the pixels forming the partial area are selected.

* * * * *